(12) United States Patent
Adedeji

(10) Patent No.: US 6,794,450 B2
(45) Date of Patent: Sep. 21, 2004

(54) HIGH FLOW COMPOSITIONS OF COMPATIBILIZED POLY(ARYLENE ETHER) POLYAMIDE BLENDS

(75) Inventor: Adeyinka Adedeji, Albany, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/683,955

(22) Filed: Mar. 6, 2002

(65) Prior Publication Data

US 2003/0171503 A1 Sep. 11, 2003

(51) Int. Cl.[7] .......................... C08L 71/12; C08L 77/00
(52) U.S. Cl. ................ 525/92 B; 525/92 D; 525/92 F; 525/397; 525/425
(58) Field of Search ............... 525/397, 92 B, 525/425

(56) References Cited

U.S. PATENT DOCUMENTS

| | | | |
|---|---|---|---|
| 2,071,250 A | 2/1937 | Carothers | 260/106 |
| 2,071,251 A | 2/1937 | Carothers | 18/54 |
| 2,130,523 A | 9/1938 | Carothers | 260/124 |
| 2,130,948 A | 9/1938 | Carothers | 18/54 |
| 2,241,322 A | 5/1941 | Hanford | 260/2 |
| 2,312,966 A | 3/1943 | Hanford | 260/78 |
| 2,512,606 A | 6/1950 | Bolton et al. | 260/78 |
| 2,933,480 A | 4/1960 | Gresham et al. | 260/80.5 |
| 3,093,621 A | 6/1963 | Gladding | 260/80.5 |
| 3,211,709 A | 10/1965 | Adamek et al. | 260/80.7 |
| 3,257,357 A | 6/1966 | Stamatoff | 260/47 |
| 3,257,358 A | 6/1966 | Stamatoff | 260/47 |
| 3,306,874 A | 2/1967 | Hay | 260/47 |
| 3,306,875 A | 2/1967 | Hay | 260/47 |
| 3,379,792 A | 4/1968 | Finholt | 260/857 |
| 3,428,699 A | 2/1969 | Schleimer | 260/669 |
| 3,639,517 A | 2/1972 | Kitchen et al. | 260/879 |
| 3,646,168 A | 2/1972 | Barrett | 260/889 |
| 3,756,999 A | 9/1973 | Stetter et al. | 260/88.2 |
| 3,790,519 A | 2/1974 | Wahlborg et al. | 260/28.5 |
| 3,822,227 A | 7/1974 | Heinz et al. | 260/28.5 |
| 3,876,721 A | 4/1975 | Yasui et al. | 260/680 |
| 3,884,993 A | 5/1975 | Gros | 260/897 |
| 3,894,999 A | 7/1975 | Boozer et al. | 260/80.78 |
| 3,914,266 A | 10/1975 | Hay | 260/438.1 |
| 4,028,341 A | 6/1977 | Hay | 260/47 |
| 4,054,612 A | 10/1977 | Yagi et al. | 260/669 |
| 4,059,654 A | 11/1977 | Von Bodungen et al. | 260/897 |
| 4,097,550 A | 6/1978 | Haaf et al. | 260/876 |
| 4,154,712 A | 5/1979 | Lee, Jr. | 260/29.1 |
| 4,166,055 A | 8/1979 | Lee, Jr. | 260/30.6 |
| 4,315,086 A | 2/1982 | Ueon et al. | 525/391 |
| 4,507,466 A | 3/1985 | Tomalia et al. | 528/332 |
| 4,584,334 A | 4/1986 | Lee, Jr. et al. | 524/151 |
| 4,600,741 A | 7/1986 | Aycock et al. | 524/139 |
| 4,642,358 A | 2/1987 | Aycock et al. | 549/245 |
| 4,659,760 A | 4/1987 | van der Meer | 524/141 |
| 4,732,938 A | 3/1988 | Grant et al. | 525/92 |
| 4,806,297 A | 2/1989 | Brown et al. | 264/102 |
| 4,806,602 A | 2/1989 | White et al. | 525/297 |
| 4,816,510 A | 3/1989 | Yates, III | 524/449 |
| 4,826,933 A | 5/1989 | Grant et al. | 525/397 |
| 4,866,114 A | 9/1989 | Taubitz et al. | 524/100 |
| 4,873,276 A | * 10/1989 | Fujii | 524/153 |
| 4,927,894 A | 5/1990 | Brown | 525/390 |
| 4,935,472 A | 6/1990 | Brown et al. | 525/394 |
| 4,980,424 A | 12/1990 | Sivavec | 525/397 |
| 5,041,504 A | 8/1991 | Brown et al. | 525/396 |
| 5,081,185 A | 1/1992 | Haaf et al. | 525/68 |
| 5,089,566 A | 2/1992 | Brown et al. | 525/396 |
| 5,115,042 A | 5/1992 | Khouri et al. | 525/397 |
| 5,120,801 A | * 6/1992 | Chambers | 525/397 |
| 5,231,146 A | 7/1993 | Brown et al. | 525/396 |
| 5,237,005 A | 8/1993 | Yates, III | 525/92 |
| 5,258,455 A | 11/1993 | Laughner et al. | 525/68 |
| 5,290,881 A | 3/1994 | Dekkers | 525/397 |
| 5,376,724 A | 12/1994 | Bailly et al. | 525/132 |
| 5,418,301 A | 5/1995 | Hult et al. | 525/437 |
| 5,461,096 A | 10/1995 | Bopp et al. | 524/145 |
| 5,530,092 A | 6/1996 | Meijer et al. | 528/363 |
| 5,587,446 A | 12/1996 | Frechet et al. | 526/333 |
| 5,663,247 A | 9/1997 | Sorensen et al. | 525/533 |
| 5,731,095 A | 3/1998 | Milco et al. | 428/482 |
| 5,830,986 A | 11/1998 | Merrill et al. | 528/332 |
| 5,859,130 A | 1/1999 | Gianchandai, et al. | 525/89 |
| 5,916,970 A | 6/1999 | Lee, Jr. et al. | 525/133 |
| 5,981,656 A | 11/1999 | McGaughan et al. | 525/66 |
| 5,998,565 A | 12/1999 | de Brabander-van den Berg | 528/176 |
| 6,414,084 B1 | 7/2002 | Adedeji | |
| 6,497,959 B1 | * 12/2002 | Mhetar | 428/412 |

FOREIGN PATENT DOCUMENTS

| | | |
|---|---|---|
| EP | 0814097 A2 | 6/1997 |
| WO | WO 96/01865 | 1/1996 |
| WO | WO97/19987 | 6/1997 |
| WO | WO97/45474 | 12/1997 |
| WO | 01/74946 | * 10/2001 |

OTHER PUBLICATIONS

European Plastics News, "Dendritic additives present advantages for thermoplastics", Mar. 1999 (10 pages).
Chapter 3 of Organic Polymer Chemistry, 2nd edition K.G. Saunders, Chapman and Hall, 1998.
Safety Data Sheet, "Boltorn H 20" by Perstorp Specialty Chemicals, Apr. 21, 1998, p. 1.
International Search Report dated Sep. 27, 2002.
EP0776940. Publication Date Jun. 4, 1997. English Abstract. 1 page.
EP0564243. Publication date: Oct. 6, 1993. English Abstract. 1 page.
EP0462410. Publication date: Dec. 27, 1991. English Abstract. 1 page.
EP0440939. Publication Date: Aug. 14, 1991. English Abstract. 1 page.

(List continued on next page.)

Primary Examiner—Patricia A. Short

(57) ABSTRACT

A thermoplastic composition comprises a compatibilized poly(arylene ether)/polyamide resin blend and a dendritic polyester resin.

23 Claims, No Drawings

OTHER PUBLICATIONS

EP0267382. Publication Date: May 18, 1988. English Abstract. 1 page.
EP0253334. Publication Date: Jan. 20, 1988. English Abstract. 1 page.
EP0234063. Publication Date: Sep. 2, 1987. English Abstract. 1 page.
EP0234060. Publication Date: Sep. 2, 1987. English Abstract. 1 page.

* cited by examiner

HIGH FLOW COMPOSITIONS OF COMPATIBILIZED POLY(ARYLENE ETHER) POLYAMIDE BLENDS

BACKGROUND OF INVENTION

The invention relates to a method of enhancing the melt flow characteristics of compositions comprising a compatibilized poly(arylene ether)/polyamide resin blend.

Poly(arylene ether) resins are commercially attractive materials because of their unique combination of physical, chemical, and electrical properties. Furthermore, the combination of these resins with polyamide resins into compatibilized blends results in additional overall properties such as chemical resistance and high strength. Examples of such compatibilized blends can be found in U.S. Pat. No. 4,315,086 to Ueno, et al; U.S. Pat. No. 4,659,760 to van der Meer; and U.S. Pat. No. 4,732,938 to Grant, et al. The properties of these blends can be further enhanced by the addition of various additives such as impact modifiers, flame retardants, light stabilizers, processing stabilizers, heat stabilizers, antioxidants and fillers.

The physical properties of poly(arylene ether)/polyamide blends make them attractive for a variety of end-use articles in the automotive market, especially for under hood and various exterior components. Many of these components are subjected to a variety of abuses such as impacts and as such require outstanding impact resistance and ductility. Moreover, many of these same articles are preferentially produced using conversion techniques such as injection molding. Some of the desirable applications, for example connectors, have very thin wall sections and therefore require resins that have very low viscosities in order to completely fill the molding tools. Conventional poly(arylene ether)/polyamide blends have inadequate flow properties at the processing temperatures that are needed to minimize the thermal degradation of the resins. Increasing the processing temperature to higher than these temperatures in order to reduce viscosity of the blends results in brittle parts and many surface imperfections in the final part, both of which are unacceptable.

It is therefore apparent that a need continues to exist for compatibilized poly(arylene ether)/polyamide compositions that have improved melt flow yet retain the other attractive physical properties.

SUMMARY OF INVENTION

The needs discussed above have been generally satisfied by the discovery of a thermoplastic composition comprising a compatibilized poly(arylene ether)/polyamide resin blend and a dendritic polyester resin.

In another embodiment, a method of enhancing the melt flow of compatibilized poly(arylene ether)/polyamide resin blends comprises intimately mixing a poly(arylene ether) resin, a polyamide resin, and a compatibilizing agent with a dendritic polyester resin.

Alternatively, a method for enhancing the melt flow of a compatibilized poly(arylene ether)/polyamide resin blend comprises intimately mixing a compatibilized poly(arylene ether)/polyamide resin blend with a dendritic polyester resin.

DETAILED DESCRIPTION

A thermoplastic composition comprises a compatibilized poly(arylene ether)/polyamide resin blend and a dendritic polyester resin. The inclusion of as little as 0.5 weight percent of dendritic polyester resin can increase the melt flow rate of the compatibilized poly(arylene ether)/polyamide resin blend by as much as 100%. Melt flow rate is defined as the mass of plastic melt that flows through an orifice at a defined temperature and load on the plastic melt. The melt flow rate values contained herein were determined according to ASTM method D1238 (same as ISO 1130). Due to the increased melt flow, the thermoplastic composition may be formed into articles with broad ranges of thicknesses by injection molding without degradation of physical properties such as the heat distortion temperature due to thermal degradation.

Compatibilized poly(arylene ether)/polyamide resin blends are produced by combining poly(arylene ether), polyamide and a compatibilizing agent. The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (I):

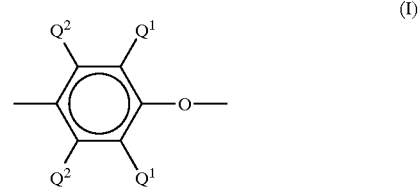

(I)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s further include combinations comprising at least one of the above.

The poly(arylene ether) generally has a number average molecular weight of about 3,000–40,000 atomic mass units (amu) and a weight average molecular weight of about 20,000–80,000 amu, as determined by gel permeation chromatography. The poly(arylene ether) may have an intrinsic viscosity of about 0.10 to about 0.60 deciliters per gram (dl/g), preferably about 0.29 to about 0.48 dl/g, as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

Poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Useful poly(arylene ether) also include those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the contemplated poly(arylene ether) include all those presently known, irrespective of variations in structural units or ancillary chemical features. Poly(arylene ether) is typically employed in amounts of about 30 to about 90 weight percent, preferably about 35 to about 65 weight percent and more preferably about 40 to about 60 weight percent, based on the total weight of the composition.

Polyamide resins are a generic family of resins known as nylons, characterized by the presence of an amide group (—C(O)NH—). Nylon-6 and nylon-6,6 are the generally preferred polyamides and are available from a variety of commercial sources. Other polyamides, however, such as nylon-4,6, nylon-12, nylon-6,10, nylon 6,9, nylon 6/6T and nylon 6,6/6T with triamine contents below about 0.5 weight percent, as well as others, such as the amorphous nylons may be useful for particular PPE-polyamide applications. Mixtures of various polyamides. as well as various polyamide copolymers, are also useful. The most preferred polyamide is polyamide-6.

Polyamides can be obtained by a number of well known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylene diamine, di-(4-aminophenyl)methane, di-(4-aminocyclohexyl)methane; 2,2-di-(4-aminophenyl)propane, 2,2-di-(4-aminocyclohexyl)propane, among others. Copolymers of caprolactam with diacids and diamines are also useful.

Polyamides having viscosity of up to about 400 ml/g can be used, with a viscosity of about 90 to about 350 ml/g preferred, and about 110 to about 240 ml/g especially preferred, as measured in a 0.5 wt % solution in 96 wt % sulfuric acid in accordance with ISO 307. Polyamide is typically employed in amounts of about 10 to about 70 weight percent, preferably about 20 to about 65 weight percent and more preferably about 25 to about 60 weight percent, based on the total weight of the composition.

Compatibilizing agents improve the physical properties of the poly(arylene ether)/polyamide resin blend and enable the use of a greater proportion of the polyamide component. When used herein, the expression "compatibilizing agent" refers to those polyfunctional compounds which interact with the poly(arylene ether), the polyamide, or, preferably, both. This interaction may be chemical (e.g. grafting) or physical (e.g. affecting the surface characteristics of the dispersed phases). In either case the resulting poly(arylene ether)/polyamide composition appears to exhibit improved compatibility, particularly as evidenced by enhanced impact strength, mold knit line strength and/or elongation. As used herein, the expression "compatibilized poly(arylene ether)/polyamide resin blend" refers to those compositions which have been physically or chemically compatibilized with an agent as discussed above, as well as those compositions which are physically compatible without such agents, as taught, for example, in U.S. Pat. No. 3,379,792.

Suitable compatibilizing agents include, for example, liquid diene polymers, epoxy compounds, oxidized polyolefin wax, quinones, organosilane compounds, polyfunctional compounds, and functionalized poly(arylene ether)s obtained by reacting one or more of the previously mentioned compatibilizing agents with poly (arylene ether).

Liquid diene polymers suitable for use as compatibilizing agents include homopolymers of a conjugated diene and copolymers of a conjugated diene with at least one monomer selected from other conjugated dienes; vinyl monomers, such as styrene and alpha-methyl styrene; olefins, such as ethylene, propylene, butene-1, isobutylene, hexene-1, octene-1, and dodecene-1, and mixtures thereof. The liquid diene polymers may have a number average molecular weight of about 150 atomic mass units (AMU) to about 10,000 AMU, preferably about 150 AMU to about 5,000 AMU. These homopolymers and copolymers can be produced by the methods described in, for example, U.S. Pat. Nos. 3,428,699, 3,876,721, and 4,054,612. Specific examples of liquid diene polymers include polybutadiene, polyisoprene, poly (1,3-pentadiene), poly(butadiene-isoprene), poly(styrene-butadiene), polychloroprene, poly (butadiene-alpha methylstyrene), poly(butadiene-styrene-isoprene), poly(butylene-butadiene), and the like, and combinations comprising at least one of the foregoing liquid diene polymers.

Epoxy compounds suitable for use as compatibilizing agents include epoxy resins produced by condensing polyhydric phenols (e.g., bisphenol-A, tetrabromobisphenol-A, resorcinol and hydroquinone) and epichlorohydrin; epoxy resins produced by condensing polyhydric alcohols (e.g., ethylene glycol, propylene glycol, butylene glycol, polyethylene glycol, polypropylene glycol, pentaerythritol and trimethylolethane and the like) and epichlorohydrin, glycidyl etherified products of monohydric alcohols and monohydric phenols, such as phenyl glycidyl ether, butyl glycidyl ether and cresyl glycidyl ether; glycidyl derivates of amino compounds, such as the diglycidyl derivate of aniline; epoxidized products of higher olefinic or cycloalkene, or natural unsaturated oils (e.g., soybean oil) as well as of the foregoing liquid diene polymers; combinations comprising at least one of the foregoing epoxy compounds; and the like.

Oxidized polyolefin waxes suitable for use as compatibilizing agents are well known and described, for example, in U.S. Pat. Nos. 3,756,999 and 3,822,227. Generally, these are prepared by an oxidation or suspension oxidation of polyolefin. An especially preferred oxidized polyolefin wax is "Hoechst Wachs".

Quinone compounds suitable for use as compatibilizing agents are characterized as having at least one six-member carbon ring; at least two carbonyl groups, which may be in the same or different six-member carbon rings, provided that they occupy positions corresponding to the 1,2- or 1,4- orientation of the monocyclic quinone; and at least two carbon-carbon double bonds in the ring structure, the carbon-carbon double bounds and carbonyl carbon-oxygen double bonds being conjugated with respect to each other. Where more than one ring is present in the unsubstituted quinone, the rings may be fused, non-fused, or both: Non-fused rings may be bound by a direct carbon-carbon double bond or by a hydrocarbon radical having conjugated unsaturation such as —C=C—C=C—.

The quinones may be substituted or unsubstituted. In substituted quinones, the degree of substitution may be from one to the maximum number of replaceable hydrogen atoms. Exemplary substituents include halogen (e.g. chlorine, bromine, fluorine, etc.), hydrocarbon radicals including branched and unbranched alkyl, cycloalkyl, olefinically unsaturated hydrocarbon radicals, aryl, alkylaryl, and halogenated derivatives thereof; and similar hydrocarbons having heteroatoms therein, particularly oxygen, sulfur, or phosphorous, and wherein the heteroatom connects the radical to the quinone ring (e.g., alkoxyl). Examples of specific quinones include 1,2-benzoquinone, 1,4-benzoquinone, 2,2'-diphenoquinone, 4,4'-diphenoquinone, 2,2',6,6'-tetramethyl-4,4'-diphenoquinone, 1,2-naphthoquinone, 1,4-naphthoquinone, 2,6-naphthoquinone, chloranils, 2-chloro-1,4-benzoquinone, 2,6-dimethyl-1,4-benzoquinone, combinations comprising at least one of the foregoing quinones, and the like.

Organosilane compounds suitable as compatibilizing agents are characterized as having at least one silicon atom bonded to a carbon through an oxygen link and at least one carbon-carbon double bond or carbon-carbon triple bond and/or a functional group selected from an amine group or a mercapto group, provided that the functional group is not directly bonded to the silicon atom. In such compounds, the C—O—Si component is generally present as an alkoxy or acetoxy group bonded directly to the silicon atom, wherein the alkoxy or acetoxy group generally has less than 15 carbon atoms and may also contain hetero atoms (e.g., oxygen). Additionally, there may also be more than one silicon atom in the compound, such multiple silicon atoms, if present, being linked through an oxygen link (e.g., siloxanes); a silicon-silicon bond; or a divalent hydrocarbon radical (e.g., methylene or phenylene groups); or the like. Examples of suitable organosilane compounds include gamma-aminopropyltriethoxysilane, 2-(3-cyclohexanyl) ethyltrimethoxysilane, 1,3-divinyltetraethoxysilane, vinyl-tris-(2-methoxyethoxy)silane, 5-bicycloheptenyltriethoxysilane, and gamma-mercaptopropyltrimethoxysilane.

Polyfunctional compounds suitable as compatibilizing agents include three types. The first type of polyfunctional compounds are those having in the molecule both a carbon-carbon double bond or a carbon-carbon triple bond and at least one carboxylic acid, anhydride, amide, ester, imide, amino, epoxy, orthoester, or hydroxy group. Examples of such polyfunctional compounds include maleic acid, maleic anhydride, fumaric acid, glycidyl acrylate, itaconic acid, aconitic acid, maleimide, maleic hydrazide, reaction products resulting from a diamine and maleic anhydride, dichloro maleic anhydride, maleic acid amide, unsaturated dicarboxylic acids (e.g. acrylic acid, butenoic acid, methacrylic acid, ethylacrylic acid, pentenoic acid), decenoic acids, undecenoic acids, dodecenoic acids, linoleic acid, esters of the foregoing unsaturated carboxylic acids, acid amides of the foregoing unsaturated carboxylic acids, anhydrides of the foregoing unsaturated carboxylic acids, unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer up to 30), unsaturated amines resulting from replacing from replacing the —OH group(s) of the above unsaturated alcohols with $NH_2$ groups, functionalized diene polymers and copolymers, and the like. Of these, two of the preferred compatibilizing agents for compositions of the present invention are maleic anhydride and fumaric acid.

The second group of polyfunctional compounds have both (a) a group represented by the formula (OR) wherein R is hydrogen or an alkyl, aryl, acyl, or carbonyl dioxy group, and (b) at least two groups each of which may be the same or different selected from carboxylic acid, acid halide, anhydride, acid halide anhydride, ester, orthoester, amide, imido, amino, and various salts thereof. Typical of this group of compatibilizers are the aliphatic polycarboxylic acids, acid esters and acid amides represented by the formula:

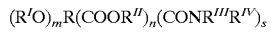

$(R'O)_mR(COOR'')_n(CONR'''R^{IV})_s$ wherein R is a linear or branched chain, saturated aliphatic hydrocarbon of from 2 to 20, preferably 2 to 10, carbon atoms; $R^I$ is hydrogen or an alkyl, aryl, acyl or carbonyl dioxy group of 1 to 10, preferably 1 to 6, more preferably 1 to 4, carbon atoms, especially preferred is hydrogen; each $R^{II}$ is independently hydrogen or an alkyl or aryl group from 1 to 20 carbon atoms, preferably from 1 to 10 carbon atoms; each $R^{III}$ an $R^{IV}$ are independently hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein (OR$^I$) is alpha or beta to a carbonyl group and at least two carbonyl groups are seperated by 2 to 6 carbon atoms. Obviously, $R^I$, $R^{II}$, $R^{III}$ and $R^{IV}$ cannot be aryl when the respective substituent has less than 6 carbon atoms.

Suitable polycarboxylic acids include, for example, citric acid, malic acid, agaricic acid, and the like; including the various commercial forms thereof, such as for example, the anhydrous and hydrated acids. Of these, citric acid is another of the preferred compatibilizing agents. Illustrative of esters useful herein include, for example, acetyl citrate and mono- and/or distearyl citrates and the like. Suitable amides useful herein include, for example, N,N'-diethyl citric acid amide, N-phenyl citric acid amide, N-dodecyl citric acid amide, N,N'-didodecyl citric acid amide, and N-dodecyl malic acid. Especially preferred derivates are the salts thereof, including the salts with amines and/preferably, the alkali and alkaline earth metal salts. Exemplary of suitable salts include calcium maleate, calcium citrate, potassium maleate, and potassium citrate.

The third group of polyfunctional compounds have both (a) an acid halide group, most preferably an acid chloride group and (b) at least one carboxylic acid, anhydride, ester, epoxy, orthoester, or amide group, preferably a carboxylic acid or anhydride group. Examples of compatibilizers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. Among these, trimellitic anhydride acid chloride is preferred. Furthermore, it is especially preferred that compatibilizers of this group be prereacted with at least a portion of the poly(arylene ether) whereby the compatibilizing agent is a poly(arylene ether)-functionalized compound.

Preferred compatibilizing agents include citric acid, maleic acid, maleic anhydride, malic acid, fumaric acid, and the like, and combinations comprising at least one of the foregoing compatibilizing agents.

The above and other compatibilizing agents are more fully described in U.S. Pat. Nos. 4,315,086; 4,600,741; 4,642,358; 4,826,933; 4,866,114, 4,927,894; 4,980,424; 5,041,504; and 5,115,042.

The foregoing compatibilizing agents may be used alone or in various combinations of one another with another. Furthermore, they may be added directly to the melt blend or pre-reacted with either or both the poly(arylene ether) and polyamide, as well as with other resinous materials employed in the preparation of the compositions of the present invention. With many of the foregoing compatibilizing agents, particularly the polyfunctional compounds, even greater improvement in compatibility is found where at least a portion of the compatibilizing agent is pre-reacted, either in the melt or in a solution of a suitable solvent, with all or a part of the poly(arylene ether). It is believed that such pre-reacting may cause the compatibilizing agent to react with the polymer and, consequently, functionalize the poly (arylene ether) as noted above. For example, the poly (arylene ether) may be pre-reacted with maleic anhydride to form an anhydride functionalized poly(arylene ether) that has improved compatibility with the polyamide compared to a non-functionalized poly (arylene ether).

Where the compatibilizing agent is employed in the preparation of the compatibilized poly(arylene ether)/polyamide resin blend, the initial amount used will be dependent upon the specific compatibilizing agent chosen and the specific polymeric system to which it is added. Typically, the compatibilizing agent may be present in an amount of about 0.05 weight percent to about 5 weight percent. Within this range, the compatibilizing agent amount may preferably be at least about 0.1 weight percent, more preferably at least about 0.3 weight percent, yet more preferably at least about 0.5 weight percent. Also within this range, it may be preferred to use a compatibilizing agent amounts up to about 2 weight percent, more preferably up to about 1 weight percent, based on the total weight of the composition.

The dendritic polyester resin comprises a starburst configuration with polyester branching units bound to a core. Optionally the polyester branching units have hydroxy functional groups at the terminal end that provide hydroxy groups at the periphery of the dendritic polymer. A portion of the terminal hydroxyl groups on the dendritic resin may be reacted to provide chain termination or functional groups. The dendritic polyester resin preferably has a weight average molecular weight, as determined by gel permeation chromatography, within the range of 1,000 to 5,000. The composition preferably comprises less than about 15 weight percent (wt %), preferably less than about 10 wt %, and more preferably less than about 6 wt % of the dendritic polyester resin based on the total weight of the composition.

The term dendritic polyester resin as used herein refers to both dendrimers and hyperbranched polymers known in the art comprising polyester branching units. Dendrimers and hyperbranched polymers suitable for use in this invention are well defined, highly branched macromolecules that radiate from a central core and are synthesized through a stepwise repetitive branching reaction sequence. Those preferred herein are the star or starburst dendritic polymers having a multifunctional core with radial branching units which extend from the core. The repetitive branching sequence typically guarantees complete shells for each generation, lending to polymers that are typically monodisperse. The synthetic procedures for dendritic polymer preparation often provide nearly complete control over the size, shape, surface/interior chemistry, flexibility and topology. This invention includes the use of dendritic polymers with complete and symmetrical branches as well as incomplete and asymmetric branches. An example of a suitable synthesis method is to employ a multifunctional compound, such as ethylene diamine, as a core building block. This multifunctional core is first reacted with acrylonitrile to provide a structure with four nitrile groups. These nitrile groups are reduced to amine units to complete the first cycle. Further reaction cycles prepare dendritic polymers with 8, 16, 32, 64, 128, etc. primary amino groups. The terminal ends of these branching units can be functionalized, if desired, with conventional functional units for dendritic polymers such as hydroxy groups, epoxy groups and ether groups.

The weight average molecular weight of preferred dendritic polyester resins can be about 1,000 to about 21,000 and is preferably about 1,500 to about 12,000, as determined by gel permeation chromatography. When attempting to increase melt flow, the most preferred values are at the low end of the molecular weight range of about 1,500 to about 5,000. Preferably the dendritic polyester resins have a narrow polydispersity of about 1.3 to about 1.5 and a melt viscosity of 1 to 250 Pa at a temperature of 110° C. and shear rate of 30 sec$^{-1}$. The dendritic polyester resins can optionally be functionalized either in the core or at the periphery of the branching units. Polar groups and non-polar groups may be bonded to the periphery of the dendritic polyester resin as desired, depending on the nature of the thermoplastic composition formulation. Preferably, hydroxy and/or epoxy groups are bound at the terminal ends of the dendritic polyester resins.

The molecules that can be used as a core contain at least one functional group and preferably contain multiple functional groups. These include ammonia, methanol, polymethylene diamines, diethylene triamine, triethylene tetramine, tetraethylene pentamine, linear and branched polyethylene imine, methylamine, hydroxyethylamine, octadecylamine, polyaminoalkylarenes, heterocyclic amines such as imidazolines and piperidines, morpholine, piperazine, pentaerythritol, sorbitol, mannitol, polyalkylenepolyols such as polyethylene glycol and polypropylene glycol, glycols such as ethylene glycol, polyalkylene polymercaptans, phosphine, glycine, thiophenols, phenols, melamine and derivatives thereof such as melamine tris (hexamethylenediamine).

Preferred dendritic polymers are sold under the trademark BOLTORN® available from Perstorp Specialty Chemicals, Perstorp, Sweden. Of this series, BOLTORN H20 and BOLTORN H30 dendritic polymers, which are functionalized with hydroxy groups at the periphery, are preferred and have a weight average molecular weight in the range of about 1,000 to about 4,000.

Suitable central initiator molecules for the polyester type dendritic polymers include cycloaliphatic or aromatic diols, triols, tetraols, sorbitol, manitol, dipentaerythritol, a monofunctional alcohol and an alkoxylate polymer having a molecular weight less than 2000. Examples of suitable diols include 1,3-propanediol, 1,2-propanediol, 1,3-butanediol, 1,2-ethanediol, 1,4-butanediol, 1,5-pentanediol, 1,6-hexanediol and polytetrahydrofuran.

Suitable polyester chain extenders are monofunctional carboxylic acids having at least two hydroxyl groups such as α, α-bis(hydroxymethyl)-propionic acid, α, α-bis(hydroxymethyl)-butyric acid, α, α, α-tris(hydroxymethyl)-acetic acid, α, α-bis(hydroxymethyl)-butyric acid, α, α-bis(hydroxymethyl)-propionic acid, α, β-dihydroxypropionic acid, heptonic acid, citric acid, d- or l- tartaric acid or α-phenylcarboxylic acids such as 3,5-dihydroxybenzoic acid.

The optional chain terminating agents which can be used include saturated monofunctional carboxylic acids, saturated fatty acids, unsaturated monofunctional carboxylic acids, aromatic monofunctional carboxylic acids such as benzoic acid and difunctional or polyfunctional carboxylic acids or anhydrides thereof. An example is behenic acid. Terminal hydroxyl groups in the polyester chain extender can be reacted with chain stoppers with or without functional groups. Suitable polyester-based dendritic polymers are described in U.S. Pat. Nos. 5,418,301 and 5,663,247.

Other suitable chain extenders include aliphatic di, tri or polyhydroxyfunctional saturated or unsaturated monocarboxylic acids, cycloaliphatic di, tri or polyhydroxyfunctional saturated or unsaturated monocarboxylic acids, aromatic di, tri or polyhydroxyfunctional monocarboxylic acids, aliphatic monohydroxyfunctional saturated or unsaturated di, tri or polycarboxylic acids, cycloaliphatic monohydroxy functional saturated or unsaturated di, tri or polyhydroxycarboxylic acids and aromatic monohydroxy functional di, tri or polycarboxylic acids. The esters of the above acids are also suitable.

The dendritic polyester resin is preferably used in the compositions of this invention in an amount of about 0.01 to about 15 wt % of the total composition to provide a useful balance of properties. More preferably, an amount of dendritic polyester resin of about 0.1 to about 10 wt % of the total composition is used to improve flow and even more preferably, about 0.1 to about 6 wt % of the total composition and most preferably about 0.1 to about 4 wt % of the total composition is used to improve flow while minimizing the loss of heat distortion temperature (HDT) values. Although not preferred, the dendritic polyester resin can be used in amounts up to 30 wt %.

The thermoplastic composition may further comprise an optional impact modifier. Particularly suitable thermoplastic impact modifiers are block copolymers, for example, A-B diblock copolymers and A-B-A triblock copolymers having of one or two alkenyl aromatic blocks A, which are typically styrene blocks, and a rubber block, B, which is typically an isoprene or butadiene block. The butadiene block may be partially hydrogenated. Mixtures of these diblock and triblock copolymers are especially useful.

Suitable A-B and A-B-A copolymers include but are not limited to polystyrene-polybutadiene, polystyrene-poly(ethylene-propylene), polystyrene-polybutadiene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), as well as the selectively hydrogenated versions thereof, and the like. Mixtures of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the trademark VECTOR, and Kuraray under the trademark SEPTON.

A useful amount of impact modifier is up to about 20 weight percent (wt %), with about 1 wt % to about 15 wt % preferred, and about 2 wt % to about 12 wt % especially preferred, wherein the weight percentages are based on the entire weight of the composition. In an especially preferred embodiment, the impact modifier comprises a polystyrene-polybutadiene-polystyrene block copolymer.

Additionally, the thermoplastic resin composition may optionally also contain various additives, such as antioxidants, fillers and reinforcing agents, mold release agents, UV absorbers, stabilizers such as light stabilizers and others, lubricants, plasticizers, pigments, dyes, colorants, anti-static agents, and flame retardants.

The compositions may be prepared by well-known procedures. One method of preparation is to blend the dendritic polyester resin with the poly(arylene ether), polyamide, and compatibilizing agent and compound the mixture by known techniques such as within an extruder to form a blend. Alternatively, the dendritic polyester resin can be blended and compounded with a compatibilized poly(arylene ether)/polyamide blend. Regardless of the method of preparation, the composition has a reduced viscosity and increased flow as compared to the compatibilized poly (arylene ether)-polyamide composition alone without a significant reduction in HDT values. This composition can be blended with other components or extruded, quenched and chopped into pellets. These pellets can then be melted and molded into articles of a desired shape and size or compounded again to blend with other components before additional processing in preparing finished articles.

The invention is further illustrated by the following non-limiting examples. All cited patents are herein incorporated by reference.

EXAMPLES

The following examples were prepared using the materials and amounts listed in Table 1. The amount of impact modifier, poly(arylene ether), polyamide, compatibilizing agent, and dendritic polyester resin is based on the total weight of impact modifier, poly(arylene ether), polyamide, and compatibilizing agent. The materials were combined in an extruder and pelletized. Samples were formed from the material by injection molding for testing according to ASTM methods.

| Name | Component | Amount Used (wt %?) |
|---|---|---|
| SBS vector 8508D | Impact modifier | 10.0 |
| PPO | Poly(arylene ether); intrinsic viscosity of 0.46 | 47.0 |
| Capron 1250 | Polyamide | 41.3 |
| Citric Acid | Compatibilizing agent | 0.8 |
| Boltorn H20 | Dendritic polyester resin | Varied by example |

Examples 1–14

Examples 1 and 8 are comparative examples and contain no dendritic polyester resin. In Examples 1–14 the polyamide was added in two parts, 10.0 wt % was added in the first feeder and the remainder 31.3 wt % was added in a second feeder. In examples 2–7 the dendritic polyester resin was added in the first feeder. In examples 9–14 the dendritic polyester resin was added in the second feeder. Melt flow rate was determined by measuring the average mass of melt polymer that flowed through an orifice over a period of 10 minutes (ASTM D1238). Results are shown in Table 2.

TABLE 2

| Example | Amount of dendritic polyester resin | Melt Flow Rate |
|---|---|---|
| 1* | 0 | 0.78 |
| 2 | 0.5 | 1.83 |
| 3 | 1.0 | 2.5 |
| 4 | 1.5 | 4.7 |
| 5 | 2.0 | 6.01 |
| 6 | 3.0 | 11.93 |
| 7 | 4.0 | — |
| 8* | 0 | 0.78 |
| 9 | 0.5 | 1.07 |
| 10 | 1.0 | 2.48 |
| 11 | 1.5 | 3.4 |
| 12 | 2.0 | 5.51 |
| 13 | 3.0 | 9.48 |
| 14 | 4.0 | 16.33 |

*Comparative example

As can be seen by Examples 1–14, the inclusion of a small amount of dendritic polyester resin results in a large increase in the melt flow rate.

Examples 15–20

Example 15 is comparative example and contains no dendritic polyester resin. Examples 16–20 contain varying amounts of dendritic polyester resin as shown in Table 3. In Examples 16–18 the dendritic polyester resin was added in the first feeder. In Examples 19 and 20 the dendritic polyester resin was added in the second feeder. The material was molded and tested. The results are shown in Table 3. Heat distortion temperature was determined according to ASTM D648 on 0.125 inch (3.175 millimeters) samples at 66 pounds per square inch (psi) (0.4 Mega Pascals). Notched by any Izod was determined according to ASTM D256. DYNATUP® (falling dart) total energy, energy to maximum load, and energy to failure were measured according to ASTM D3763. Flexural modulus and flexural strength were determined according to ASTM D790. Tensile strength at yield, tensile strength at break and tensile elongation at break were determined by ASTM D638.

TABLE 3

| | Example | | | | | |
|---|---|---|---|---|---|---|
| Property | 15* | 16 | 17 | 18 | 19 | 20 |
| Amount of dendritic polyester resin | 0 | 0.5 | 2.0 | 8.0 | 2.0 | 8.0 |
| HDT | 301 | — | — | 318 | 309 | 300 |
| Notched Izod | 11.7 | 3.92 | 2.74 | 8.35 | 2.78 | 13.2 |
| Energy to Failure | 41.3 | 36.3 | 23.0 | 42.6 | 37.6 | 48.0 |
| Total Energy | 41.5 | 36.3 | 23.0 | 42.6 | 37.6 | 48.0 |
| Flexural Modulus | 232600 | 248 | 212 | 274 | 234 | 278 |
| Flexural strength at yield | 10,690 | 10,520 | 9,410 | 11,640 | 10,380 | 12,050 |
| Tensile strength at yield | 7,730 | 7,080 | 6,760 | 7,380 | 6,970 | 7,700 |
| Tensile strength at break | 7,257 | 6,950 | 6,740 | 7,110 | 6,850 | 7,330 |
| Tensile elongation at break | 95 | 68 | 62 | 93 | 80 | 91 |

*Comparative example

While preferred embodiments have been shown and described, various modifications and substitutions may be made thereto without departing from the spirit and scope of the invention. Accordingly, it is to be understood that the present invention has been described by way of illustration and not limitations.

What is claimed is:

1. A thermoplastic composition comprising a compatibilized poly(arylene ether)/polyamide resin blend and a dendritic polyester resin.

2. The composition of claim 1, wherein the compatibilized poly(arylene ether)/polyamide resin blend comprises about 30 to about 90 weight percent poly(arylene ether) and about 10 to about 70 weight percent polyamide, based on the total weight of the composition.

3. The composition of claim 1, wherein the dendritic polyester resin has a weight average molecular weight of about 1,000 to about 21,000.

4. The composition of claim 1, wherein the dendritic polyester resin is present in an amount of about 0.1 to about 15 weight percent based on the total weight of the composition.

5. The composition of claim 1, further comprising an impact modifier.

6. The composition of claim 5, wherein the impact modifier is a block copolymer.

7. The composition of claim 5, wherein the impact modifier is a styrene-butadiene-styrene block copolymer.

8. A method for enhancing the melt flow of compatibilized poly(arylene ether)/polyamide blend comprising intimately mixing the compatibilized poly(arylene ether)/polyamide blend with a dendritic polyester resin.

9. The method of claim 8, wherein the compatibilized poly(arylene ether)/polyamide blend comprises about 30 to about 90 weight percent poly(arylene ether) and about 10 to about 70 weight percent polyamide, based on the total weight of the composition.

10. The method of claim 8, wherein the dendritic polyester resin has a weight average molecular weight of about 1,000 to about 21,000.

11. The method of claim 8, wherein the dendritic polyester resin is present in an amount of about 0.1 to about 15 weight percent based on the total weight of the composition.

12. The method of claim 8, wherein the compatibilized poly(arylene ether)/polyamide blend further comprises an impact modifier.

13. The method of claim 12, wherein the impact modifier is a block copolymer.

14. The method of claim 13, wherein the impact modifier is a styrene-butadiene-styrene block copolymer.

15. A method for enhancing the melt flow of compatibilized poly(arylene ether)/polyamide blend comprising intimately mixing a poly(arylene ether) resin, a polyamide resin, and a compatibilizing agent with a dendritic polyester resin.

16. The method of claim 15, wherein the compatibilized poly(arylene ether)/polyamide blend comprises about 30 to about 90 weight percent poly(arylene ether) and about 10 to about 70 weight percent polyamide, based on the total weight of the composition.

17. The method of claim 15, wherein the dendritic polyester resin has a weight average molecular weight of about 1,000 to about 21,000.

18. The method of claim 15, wherein the dendritic polyester resin is present in an amount of about 0.1 to about 15 weight percent based on the total weight of the composition.

19. The method of claim 15, further comprising intimately mixing an impact modifier with the poly(arylene ether) resin, polyamide resin, compatibilizing agent and dendritic polyester resin.

20. The method of claim 19, wherein the impact modifier is a block copolymer.

21. The method of claim 20, wherein the impact modifier is a styrene-butadiene-styrene block copolymer.

22. The method of claim 15, wherein the compatibilizing agent is a polycarboxylic acid.

23. The method of claim 22, wherein the compatibilizing agent is citric acid.

* * * * *